United States Patent [19]

Delteil et al.

[11] Patent Number: 5,229,609
[45] Date of Patent: Jul. 20, 1993

[54] DETECTION ASSEMBLY FOR AN INFRARED MONITORING SYSTEM

[75] Inventors: Alain Delteil, Paris; Jacques Barret, Orsay, both of France

[73] Assignee: SAT (Societe Anonyme de Telecommunications), France

[21] Appl. No.: 841,238

[22] Filed: Feb. 24, 1992

Related U.S. Application Data

[63] Continuation of Ser. No. 525,332, May 17, 1990, abandoned.

[30] Foreign Application Priority Data

May 18, 1989 [FR] France .................. 89 06482

[51] Int. Cl.$^5$ .................. G01C 11/00; H01L 27/146
[52] U.S. Cl. .................. 250/332; 250/334; 250/349
[58] Field of Search .................. 250/332, 334, 349, 342, 250/330; 358/213.28, 113

[56] References Cited

U.S. PATENT DOCUMENTS

| | | | |
|---|---|---|---|
| 4,238,674 | 12/1980 | Kuerbitz et al. | 250/334 |
| 4,262,199 | 4/1981 | Bridges et al. | 250/342 X |
| 4,596,930 | 6/1986 | Steil et al. | 250/332 |
| 4,771,175 | 9/1988 | Sirieix et al. | 250/332 |
| 4,849,634 | 7/1989 | Riedl | 250/332 |
| 4,873,442 | 10/1989 | Klatt | 250/334 |
| 4,910,401 | 3/1990 | Woods | 250/332 |
| 5,023,719 | 6/1991 | Zwirn | 358/113 X |

FOREIGN PATENT DOCUMENTS

2591349 3/1988 France.
2591350 5/1988 France.

OTHER PUBLICATIONS

"Thermal Imaging Systems", by M. Lloyd, 1975, Chapter 9, pp. 369–387.

Primary Examiner—Constantine Hannaher
Assistant Examiner—Edward J. Glick
Attorney, Agent, or Firm—Rosenman & Colin

[57] ABSTRACT

A detection assembly is disclosed for an infrared monitoring system, comprising a strip of elementary infrared detectors for analyzing the background of a scene. The elementary detectors are image formation detectors having sensitive areas smaller than the optical spots produced by the hot objects to be detected. The assembly comprises circuitry adapted for grouping together the image formation detectors virtually into virtual monitoring detectors having sensitive areas adapted to said optical spot, the grouping together circuitry comprising circuitry for summation in elevation of p contiguous intermediate image formation detectors at the pitch of q detectors with overlapping of p-q intermediate detectors from one monitoring detector to the next and circuitry for summation in relative bearing of r image formation samples at the pitch of s samples with an overlap of r-s samples from one monitoring pixel to the next.

3 Claims, 2 Drawing Sheets

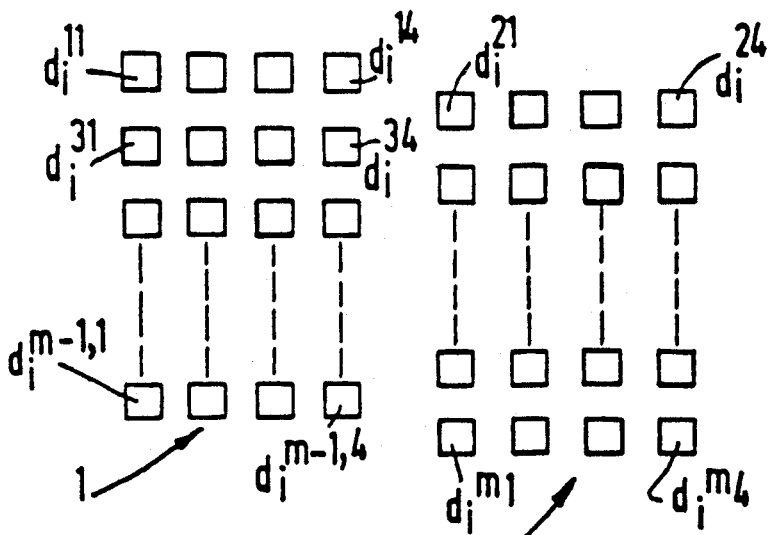
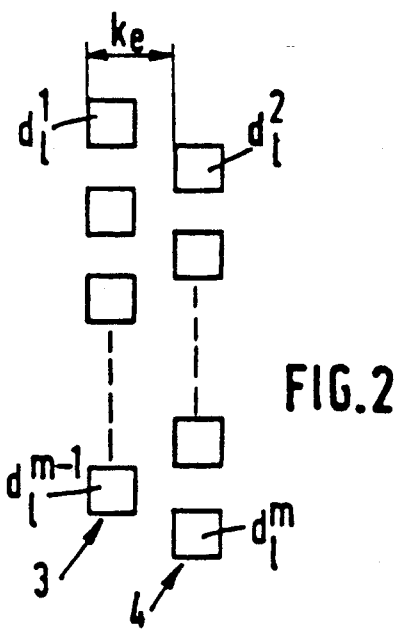
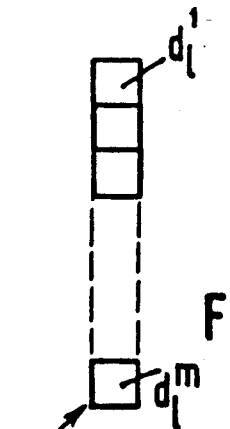
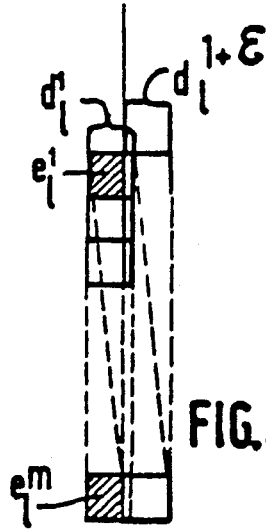
FIG.1
FIG.2
FIG.3
FIG.4
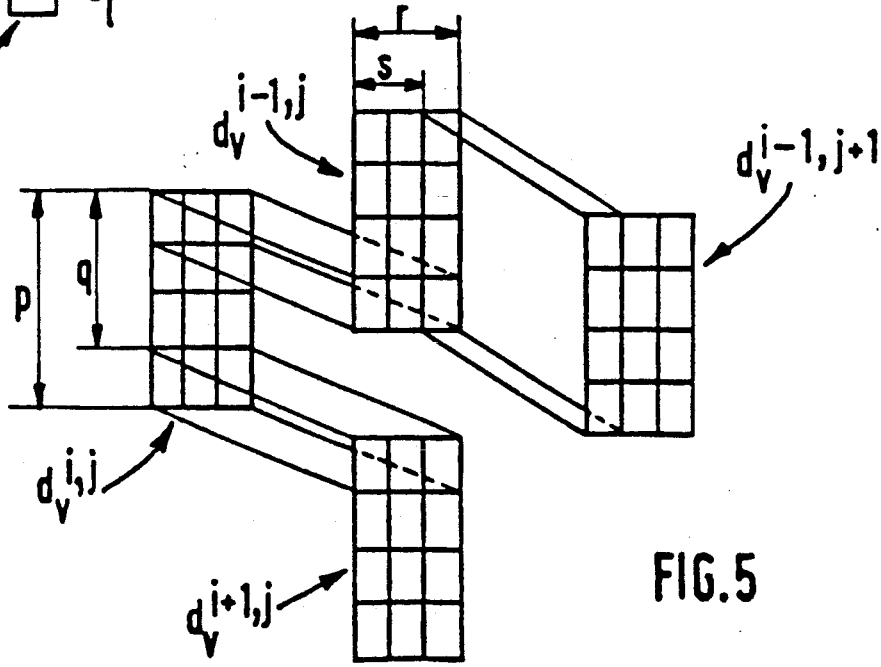
FIG.5

DETECTION ASSEMBLY FOR AN INFRARED MONITORING SYSTEM

This is a continuation of application Ser. No. 07/525,332, filed May 17, 1990, now abandoned.

BACKGROUND OF THE INVENTION

The present invention relates to a detector assembly for a panoramic or sectorial infrared monitoring system.

Such a detector assembly may comprise an optical device, in the focal plane thereof, a detector strip—infrared photodiodes—for analyzing landscapes, or the background of a scene, hybrided to a pre-processing wafer containing charge transfer circuits, namely and essentially, input circuits associated with the photodiodes, for integrating their output currents, preamplification, filtering and multiplexing circuits and an output circuit forming an interface between the preprocessing wafer and a separate subsequent processing wafer.

When the analysis strip comprises photodiodes disposed in a plurality of lines of several photodiodes, the output current of each photodiode may then be processed in an integration circuit delivering a charge signal to a delay line in which it undergoes a given phase-shift, the charge signals delivered by all the delay lines associated with the photodiodes of the same line being added in a summator. The circuit in question is a delay-summation circuit called TDI (time delay integration).

The pre-processing wafer may also comprise base-clipping, evacuation and anti-dazzle circuits, the purpose of the latter function being to derive all the diode current when it is too high and to prevent a saturating current from adversely affecting the operation of the circuits of the processing wafer.

Infrared detector assemblies are used at the present time either in monitoring systems, or in image formation systems or in combined systems.

In image formation systems, for analyzing landscapes in real time, the elementary detectors of the analysis strip must be the smallest possible so as to obtain the best possible angular resolution and thus optimize the recognition and identification range performances.

The strips of the image formation systems may be of several types, for example and at least, the four following ones:

1. Strip comprising a series of elementary detectors aligned in columns and slightly offset with respect to each other. Such an arrangement involves interlacing of the scanning frames, i.e. a shift from one frame to the next, by an opto-mechanical device, which however leads to only a low overlapping rate.

2. Strip comprising two series of elementary detectors aligned respectively in two columns with, in each column, a shift between two adjacent detectors by the dimension of a detector, the shifts of the two columns being alternate. Such a geometrical arrangement also involves interlacing of the scanning frames to obtain an overlap rate close to 2.

3. Strip comprising more than two series, for example four, of detectors aligned respectively in as many columns with, in each column, between two adjacent detectors, the same shift as in the strip of the second type, the respective shifts of the columns being themselves slightly offset with respect to each other. Such geometry already has an overlap rate close to 2 and therefore does not require frame interlacing.

4. Strip comprising two mosaics of detectors disposed in m lines and n (for example four) columns, the respective lines of the two mosaics being alternate. This geometry, similar to that of type 2 provides a redundancy, each image element being analyzed successively by n detector elements.

In monitoring systems the elementary detectors of the strips used up to now were on the contrary sufficiently large to adapt themselves to the optical spots produced by the hot points of the objects (aircraft and other targets) to be detected and whose temperature is very much greater than that of the background of the scene.

As an example of monitoring strip geometry, two columns of detectors have been adopted spaced apart by the dimension of an optical spot produced by a pin-point target and the detectors of the two columns being respectively slightly offset so as to obtain a certain overlap from one column to the next in order not to produce a signal loss and so to make the target extraction algorithms efficient.

The monitoring strips used up to now, with detectors having a relatively large sensitive area, have however two major drawbacks.

Produced on a small scale, their cost is first of all very high. Then, they do not use redundancy. With a redundancy of order n provided by an IR-CCD detector, saturation of the storage capacities and the processing circuits is rapidly reached because of the size of the elements and so of the amount of photons collected. Technology does not allow the dynamics of the processing circuits to be extended at will. It is necessarily limited, which inevitably leads to a saturation phenomenon which is quite prejudicial in monitoring in which it is desirable to detect objects whose temperature is very much greater than that of the background of the scene. For example, in the saturating temperature range, two hot points of respectively different temperatures can no longer be differentiated. The larger the sensitive areas of the detectors, the higher the fixed spatial noise, the higher should be the dynamics also and, since this is not so, the more the processing circuits risk being saturated.

The purpose of the present invention is then to overcome these drawbacks.

SUMMARY OF THE INVENTION

For this, the present invention provides a detector assembly for an infrared monitoring system for detecting hot objects on the background of a scene, comprising a strip of elementary infrared detectors for analyzing the background of a scene, which detector assembly is characterized by the fact that the elementary detectors are image formation detectors with sensitive areas smaller than the optical spots produced by the hot objects to be detected and it comprises means adapted for grouping together the image formation detectors virtually into virtual monitoring detectors with sensitive areas adapted to said optical spots.

The advantages of the invention are multiple. Advantage is taken of the low cost price of image formation detectors produced on a large scale. The maintenance costs are reduced because of the standardization of the detector module thus obtained. A large part of the associated electronic pre-processing and processing circuits may be used not only in the image formation systems but also in the monitoring systems.

From the saturation point of view, the drawbacks related to detectors with large sensitive areas are eliminated. The grouping together of the elementary detectors makes is possible to obtain virtual monitoring detectors having a sensitive area of any size, so adapted to any optical spot.

In the preferred embodiment of the detector assembly of the invention, geometry correction means are provided for, before grouping together into virtual monitoring detectors, grouping together the elementary image formation detectors into m contiguous intermediate virtual detectors aligned in a column, having the same sensitive area as the image formation detectors.

Still preferably, the grouping together means may be means for bi-directional grouping together, in relative bearing and elevation. These grouping together means may comprise means for summation, in the elevation direction, of p contiguous intermediate detectors at the pitch of q, less than p, detectors with consequently an overlap of (p-q) intermediate detectors from one monitoring detector to the next.

Because of the mechanical scanning, by a mirror pivoting, for example in the azimuth or bearing direction, and because of the electronic scanning for reading the strip of the m intermediate virtual detectors extending in the elevation direction, the intermediate detectors slide over one another, or overlap each other in twos, in the relative bearing direction. Thus, a relative bearing shift is obtained corresponding to intermediate detection "samples", as discussed in "Thermal Imaging Systems", by M. Lloyd, 1975, Chapter 9, pp. 369-387. The reason for such sliding is simple: between the time of reading the intermediate detector no. 1 and the time $\epsilon$ after reading of detector no. m, the strip has moved relatively slightly in the relative bearing direction.

In this case, the grouping together means of the assembly of the invention may advantageously comprise relative bearing summation means similar to the elevation summation means, with overlapping of (r-s) intermediate samples from one monitoring detector, or pixel, to the next.

In this case, the ratio between the number of monitoring pixels and the number of image formation pixels is 1/qs.

Such bi-directional summation provides an appreciable gain:
attenuation is avoided of the signal from pinpoint targets situated at the spatial limit between two scanned lines by two contiguous detectors in the direction perpendicular to that of scanning; thus, the detection probability is increased;
the signal to noise ratio is increased by matching the geometry to the dimension of the optical spots;
the rate of processing the signals is reduced, in the case evoked by qs and thus, taking into account the technologies available, efficient target extraction algorithms may be used.

BRIEF DESCRIPTION OF THE DRAWINGS

The invention will be better understood from the following description of the generation of monitoring cells in accordance with the invention, with reference to the accompanying drawings, in which:

FIG. 1 shows schematically the strip of detectors of the detection assembly of the invention;

FIG. 2 shows the strip of FIG. 1, after a first grouping together of the detectors (TDI summation);

FIG. 3 shows the strip of FIG. 2 after alignment of the detectors;

FIG. 4 illustrates the sliding in time of the strip of FIG. 3 and the generation of samples;

FIG. 5 shows the equivalent strip of the detector assembly, after generation of the virtual monitoring cells.

DESCRIPTION OF THE PREFERRED EMBODIMENTS

Figure 6:
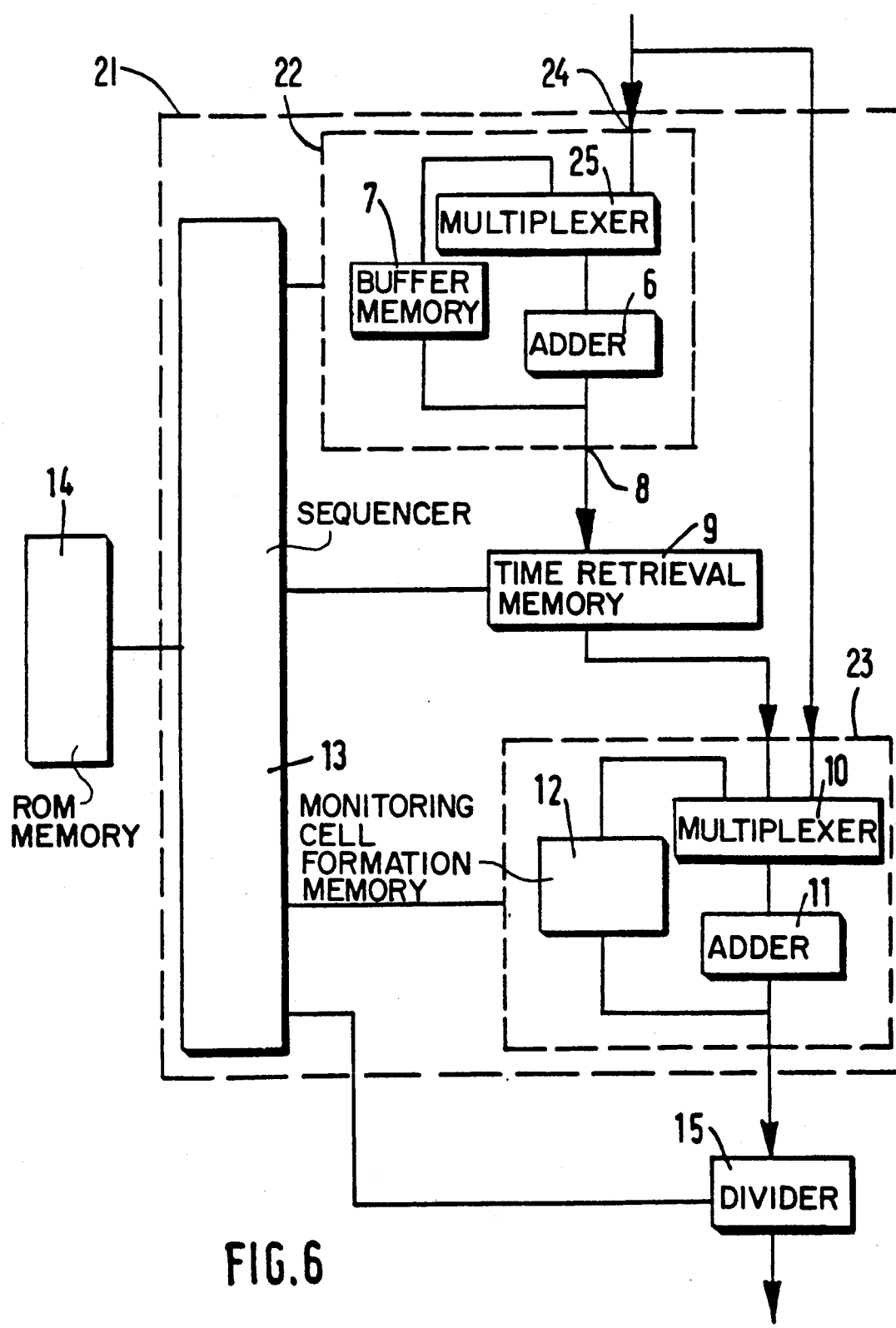
FIG. 6 shows schematically the specific integrated circuit for generation of the monitoring cells.

The different components of the assembly of the invention will now be described, which have already been mentioned in the preamble to this description and are known to a man skilled in the art. The latter may moreover usefully refer to other French patent applications in the name of the applicant, such for example as the applications FR-A-2 591 349, 2 591 350, 2 591 409.

Let us consider a strip of image formation detectors of the 4th type described in the above preamble with, here, two mosaics 1, 2 offset in azimuth, of detectors $d_i$ disposed, in each mosaic, in m/2 lines parallel to the azimuth direction, of uneven ranks in one 1, and of even ranks in the other 2, and in four columns parallel to the relative elevation direction (FIG. 1). Mosaic 1 thus comprises a first line of four detectors $d_i{}^{11} \ldots d_i{}^{14}$, a second line of detectors $d_i{}^{31} \ldots d_i{}^{34} \ldots$ and a last line of detectors $d_i{}^{m-1,1} \ldots d_i{}^{m-1,4}$ and mosaic 2, a first line of detectors $d_i{}^{21} \ldots d_i{}^{24} \ldots$ and a last line of detectors $d_i{}^{m1} \ldots d_i{}^{m4}$, the lines of the two mosaics alternating without overlap.

A first grouping together is achieved by TDI summation so as to group together the four image formation detectors of each line of each mosaic and obtain two columns 3, 4 of intermediate virtual detectors $d_I{}^1 \ldots d_I{}^{m-1}$ and $d_I{}^2 \ldots d_I{}^m$, respectively alternating from one column to the other and without overlap, the two columns being offset in time in relative bearing by Ke as depicted in FIG. 2.

A second geometry correction is made for grouping together the detectors of the two columns 3, 4 into a single column 5 of m detectors $d_I{}^1 \ldots d_I{}^m$, aligned in elevation, contiguous and having a sensitive area substantially equal to that of the image formation detectors $d_i$ (FIG. 3).

From the intermediate detectors $d_I$ of column 5, or better still from the samples $e_I$, such as shown hatched in FIG. 4, the virtual monitoring detectors $d_v$ can be formed. It will be noted that a sample $e_I$ has the same dimension in elevation as an intermediate detector $d_I$ and a smaller dimension in relative bearing because of overlapping due to sliding in relative bearing of strip 5 during its reading in elevation. Detectors $d_v$ are formed by summation in elevation of p samples $e_I$ at a pitch of q and by summation in relative bearing of r samples $e_I$ at the pitch of s. The virtual strip 5, extending in the elevation direction, is displaced—it is naturally a question of a relative displacement—perpendicularly to itself in the relative bearing direction. Thus, speaking of monitoring detectors, reference is actually made, in the relative bearing direction, to the image elements or pixels. In FIG. 5, the monitoring detectors $d_v{}^{i-1,j}$, $d_v{}^{i,j}$, $d_v{}^{i+1,j}$ and $d_v{}^{i-1,j+1}$ have been shown in an exploded view, i representing the rank of the monitoring detector in the elevation direction, j the rank of the monitoring detector in the relative bearing direction, with p=4, q=r=3 and s=2.

The values of parameters p, q, r, s and k are programmable and the monitoring detectors or pixels are obtained by means of an automatic computing device formed here by a specific ASIC circuit integrated on a standard card.

The monitoring cells $d_v{}^{i,j}$ thus obtained are adapted in relative bearing to the optical spot and they are elongate in elevation, overlapping of the contiguous cells preventing loss of detection level if one optical spot overlaps two cells.

It will be readily understood that the automatic device must, by programming, have great flexibility so as to be usable in different configurations.

Thus, for example in elevation, each monitoring cell $d_v{}^{i,j}$ may also overlap the two cells $d_v{}^{i-1,j}$ and $d_v{}^{i+1,j}$ to which it is contiguous.

In FIG. 6 a portion 21 of the specific integrated circuit has been shown for generating the monitoring cells or pixels from image formation pixels, which comprises a block 22 of even cells and general cell block 23.

The image formation pixels $d_i$ of even ranks, those at the right of FIG. 1, which are included at 4 in block 22, are grouped together there in relative bearing by a multiplexer 25 followed by an adder 6, whose output is connected to one of the inputs of the multiplexer 25 by a buffer memory 7. The pixels leaving block 2 at 8, those at the right in FIG. 2, enter a time retrieval RAM 9 whose output is connected to the input of block 23 and, more precisely, to the input of multiplexer 10 whose other input receives the image formation pixels $d_i$ of uneven ranks, those at the left in FIG. 1. The output of multiplexer 10 of block 3 is connected to the input of an adder 11, whose output is connected to a third input of multiplexer 10 by a monitoring cell formation RAM 12.

Blocks 22 and 23 are connected to a sequencer 13 controlled by a ROM 14 containing the parameters p, q, r, s, k.

At the output of memory 9, the image formation pixels of even ranks are offset in relative bearing by k samples after time retrieval of the fourth image formation pixels of uneven ranks: this is the second geometry correction mentioned above with reference to FIG. 3.

All the image formation samples are added in elevation and in relative bearing in block 23, the sum of the samples transiting through a divider block 15, comprising in this case a PROM, connected to the output of block 23 and controlled by sequencer 13 for being divided, in elevation and in relative bearing, and supplying the monitoring cells of FIG. 5.

In actual fact, considering the interlacing of the computations, the specific integrated circuit comprises here three other portions, identical to the above described portion 21, connected in parallel to divider 15.

What is claimed is:

1. In an infrared radiation monitoring system for detecting hot targets in a background that are focused as respective optical spots of a given size in a focal plane of the system, a detector converter arrangement, comprising:

a plurality of imaging detectors arranged along an azimuth direction and along an elevation direction in the focal plane for detecting the hot targets and for generating output signals indicative of the hot targets, each imaging detector having a sensor area smaller than the size of a respective optical spot; wherein the imaging detectors are arranged in two matrices or orthogonal rows and columns, each row and column containing multiple imaging detectors, and the matrices are offset relative to each other in a direction extending parallel to the columns; and converter means for processing the output signals and for grouping the imaging detectors along both the azimuth direction and the elevation direction to form an equivalent plurality of virtual monitoring detectors, each having a sensor area greater than the sensor area of a respective imaging detector and substantially equal to the size of the respective optical spot.

2. The detector converter arrangement according to claim 1, wherein the matrices have the same number of rows.

3. The detector converter arrangement according to claim 1, wherein the virtual imaging detectors are arranged in overlapping sub-groups.

* * * * *